United States Patent Office 3,116,271
Patented Dec. 31, 1963

3,116,271
POLYMERIZATION OF ESTERS OF ACRYLIC
AND METHACRYLIC ACID
William R. Watt, Newark, Del., and Bengt G. Ranby,
Swarthmore, Pa., assignors, by mesne assignments, to
FMC Corporation, San Jose, Calif., a corporation of
Delaware
No Drawing. Filed Jan. 30, 1959, Ser. No. 790,077
4 Claims. (Cl. 260—89.5)

This invention relates to novel polymerization processes. More particularly this invention relates to novel processes for polymerizing esters of acrylic and methacrylic acid.

The invention has for an object to provide novel processes for polymerizing esters of acrylic and methacrylic acid in the presence of an organic metal oxide catalyst.

Other objects and advantages of the invention will be apparent from the following description and illustrative examples.

In accordance with the present invention an acrylate or methacrylate having the general formula

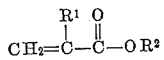

is polymerized at a temperature of from 0 to 100° C. to form a normally solid polymer. The polymer that is formed may be used as a coating, film, adhesive, or molded article.

In the general formula above $R^1$ is hydrogen or methyl and $R^2$ is an alkyl, cycloalkyl, aryl, alkaryl, or arylalkyl group, for example, methyl, ethyl, propyl, iso-propyl, n-butyl, sec-butyl, iso-butyl, amyl, hexyl, octyl, decyl, dodecyl, stearyl, cyclohexyl, phenyl, tolyl, and phenyl ethyl.

The polymer produced in accordance with this invention may be a homopolymer of any one of the above monomers or may be an interpolymer of any two or more of them.

The polymerization is carried out in the presence of a small quantity of an organic metal oxide compound having the general formula $M(OR^3)_n$. A small amount of the catalyst is suitable, for example, from 0.5 to 4% of the catalyst based on the weight of the monomer to be polymerized is suitable for this invention.

In the general formula for the catalyst $M(OR^3)_n$, M is a metal from groups Ia, IIIb, and IVa of the periodic table including, for example, sodium, potassium, lithium, boron, aluminum, titanium and zirconium, $R^3$ is alkyl, cycloalkyl, aryl, arylalkyl or alkaryl group, for example, methyl, ethyl, propyl, isopropyl, n-butyl, sec-butyl, isobutyl, amyl, hexyl, octyl, decyl, dodecyl, cyclohexyl-phenyl, tolyl, and phenyl ethyl, and $n$ is the valence of the metal.

In carrying out the processes a small amount of the catalyst is mixed with or dissolved in a non-reactive polar medium such as tetrahydrofuran, dimethyl formamide or alcohol. The monomer or the mixture of the monomers is slowly added with stirring and the polymerization takes place.

The following examples are illustrative of the invention:

Example 1

Two grams of sodium methoxide were added to 20 ml. of methyl methacrylate and let stand 16 hours at room temperature. A white polymeric material formed during this time and was separated from unreacted monomer by washing with alcohol.

Example 2

Two grams of aluminum isopropylate were suspended in 50 ml. of tetrahydrofuran. Fifty ml. of methyl methacrylate were added and the mixture let stand 120 hours. One hundred fifty ml. of a 50–50 solution of isopropanol-water were added. The precipitated polymer was washed and dried.

Example 3

One gram of sodium methoxide, 50 ml. of hexane and 50 ml. of methyl methacrylate were refluxed with stirring for 12 hours. Reaction was quenched at the end of this time by adding 100 ml. of isopropanol. The precipitated polymer was filtered off, washed with alcohol and water and dried under vacuum. The dried polymer weighed 11.0 grams (23.4% conversion).

Example 4

Three grams of aluminum isopropylate, 50 ml. of tetrahydrofuran and 50 ml. of methyl methacrylate were refluxed 24 hours. The reaction mixture was cooled and poured into 400 ml. of methanol plus 300 ml. of water. The precipitated polymer was filtered off, washed and dried. The dried polymeric product weighed 3.5 grams.

Example 5

Three grams of aluminum isopropylate, 50 ml. of dimethyl formamide and 50 ml. of methyl methacrylate were refluxed 3 hours. Mixture became extremely viscous during this time. The mixture was diluted by adding 270 ml. of dimethyl formamide and 30 ml. of water, then poured into 400 ml. of methanol plus 300 ml. of water. The white precipitated polymer was washed and dried. The polymeric product weighed 13.3 grams (28.3% conversion).

Example 6

Three grams of aluminum isopropylate, 50 ml. of isopropanol and 50 ml. of methyl methacrylate were refluxed 20 hours. This mixture was cooled and poured into 400 ml. of methanol plus 300 ml. of water. The precipitated polymer was filtered off, washed and dried. The dried polymeric product weighed 4.7 grams (10% conversion).

Example 7

Two grams of sodium methoxide, 50 ml. of heptane and 50 ml. of redistilled methyl methacrylate were stirred with refluxing for 4 hours. Polymer formed and wound around stirrer. The mixture was cooled to room temperature and liquid removed by decantation. The solid polymer was dissolved in hot toluene and reprecipitated in 1500 ml. of isopropanol. The dried polymer weighs 15.2 grams (32.4% conversion).

Example 8

Four ml. of tetraisopropyl orthotitanate, 50 ml. of methanol and 50 ml. of methyl methacrylate were refluxed 20 hours. Solid material was filtered off, dissolved in 400 ml. of hot methyl ethyl ketone and filtered until the filtrate came through clear. The polymer was reprecipitated in 800 ml. of water plus 400 ml. of methanol. Polymer was filtered off, washed and dried. The dried polymeric product weighed 2.6 grams (5.5% conversion).

Example 9

Two grams of sodium methoxide, 50 ml. of heptane and 50 ml. of methyl methacrylate were refluxed with stirring for 3 hours. The mixture was cooled and solid material was separated, dissolved in 400 ml. of hot methyl ethyl ketone, and reprecipitated into 800 ml. of water plus 400 ml. methanol. The polymer was filtered off, washed and dried. The product weighed 32.0 grams (68% conversion).

Example 10

Fifty ml. of heptane and 2 ml. of triethyl borate were mixed under an atmosphere of nitrogen and 50 ml. of methyl methacrylate were added dropwise with stirring. When all monomer had been added, the mixture was warmed to reflux. Within five minutes the mixture became cloudy. Stirring and refluxing were continued for 48 hours. Mixture was poured into 100 ml. of isopropanol. The precipitated polymer was filtered off, dissolved in hot methyl ethyl ketone and reprecipitated in isopropanol. Polymer weighed 3.7 grams.

We claim:

1. A method of producing normally solid homopolymer material by polymerizing at refluxing temperature a compound having the general formula

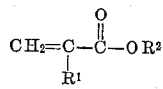

wherein $R^1$ is a member of the group consisting of hydrogen and methyl, and $R^2$ is a member of the group consisting of methyl, ethyl, n-propyl, isopropyl, n-butyl, sec-butyl, isobutyl, amyl, and hexyl in contact with from about 0.5 to about 4% by weight of a catalyst consisting of a compound having the general formula $M(OR^3)_n$ wherein M is a metal selected from the group consisting of boron, aluminum, and titanium, $R^3$ is a member of the group consisting of methyl, ethyl, n-propyl, isopropyl, n-butyl, sec-butyl, isobutyl, amyl, and hexyl, and $n$ is the valence of the metal.

2. The method of claim 1 wherein the catalyst is triethyl borate.

3. The method of claim 1 wherein the catalyst is aluminum triisopropoxide.

4. The method of claim 1 wherein the catalyst is tetraisopropyl orthotitanate.

References Cited in the file of this patent

UNITED STATES PATENTS

| | | |
|---|---|---|
| 2,400,477 | Atwood | May 21, 1946 |
| 2,433,866 | Rehberg et al. | Jan. 6, 1948 |
| 2,608,555 | Bullitt | Aug. 26, 1952 |
| 2,846,427 | Findlay | Aug. 5, 1958 |
| 2,881,156 | Pilar et al. | Apr. 7, 1959 |
| 2,910,461 | Nowlin et al. | Oct. 27, 1959 |

FOREIGN PATENTS

| | | |
|---|---|---|
| 593,797 | Great Britain | Oct. 27, 1947 |
| 785,053 | Great Britain | Oct. 23, 1957 |

OTHER REFERENCES

Lange's Handbook of Chemistry, 8th ed. (1952), pages 56–57.